United States Patent Office 2,760,955
Patented Aug. 28, 1956

2,760,955

VINYL SULFONAMIDE-ACRYLONITRILE COPOLYMERS

Harold F. Park, East Longmeadow, and Robert M. Dickey, Wilbraham, Mass., assignors to Monsanto Chemical Company, St. Louis, Mo., a corporation of Delaware No Drawing. Application May 1, 1953,
Serial No. 352,591

3 Claims. (Cl. 260—79.3)

This invention relates to new fiber-forming copolymers. More particularly, this invention relates to new copolymers of acrylonitrile that are useful in the preparation of readily dyeable fibers.

This application is a continuation-in-part of application Serial No. 274,515 filed March 1, 1952, now abandoned.

Acrylonitrile has many unique properties not possessed by most vinyl monomers. It may be reacted with unsubstituted amides to form cyanoethylation addition products or with ethylenically unsaturated compounds in order to form copolymers. When the compound to be reacted with acrylonitrile contains both an amide radical and an ethylene radical, the nature of the product will depend upon the relative reactivity of the amide radical. Unsubstituted amide radicals tend to react readily with acrylonitrile to form cyanoethylation products. The tendency towards cyanoethylation is much reduced in the case of the mono-N-substituted amides and substantially no cyanoethylation will occur in the case of the disubstituted amides. Thus, acrylonitrile will react with formamide to form a cyanoethylation product but will not react with dimethyl formamide.

It is known that unsubstituted acrylonitrile will react with N-substituted vinyl sulfonamides to form copolymers and that certain classes of substituted acrylonitrile monomers will react with unsubstituted vinyl sulfonamide to form copolymers but, heretofore, it has not been possible to prepare copolymers of unsubstituted acrylonitrile and unsubstituted vinyl sulfonamide. Vinyl sulfonamide contains an —$NH_2$ radical directly coupled to an electrophilic sulfonyl radical. As a result when unsubstituted vinyl sulfonamide is reacted with unsubstituted acrylonitrile, the normal tendency is for the acrylonitrile to react with the —$NH_2$ group of the vinyl sulfonamide in order to form a cyanoethylation product.

Accordingly, an object of the present invention is the provision of copolymers of acrylonitrile and unsubstituted vinyl sulfonamide.

Another object is the provision of a process for copolymerizing acrylonitrile with unsubstituted vinyl sulfonamide.

A further object is the provision of new synthetic fibers.

These and other objects are attained by reacting acrylonitrile with vinyl sulfonamide in a liquid medium having a pH of from 3.0 to 8.0. Fibers are prepared by dissolving the copolymer in a suitable solvent and spinning the solution in order to form filaments that can be formed into fibers. If desired, the copolymers can be cross-linked by reaction with formaldehyde, a polymer thereof or hexamethylene tetramine, such cross-linked polymers forming much stronger filaments. The reaction with the cross-linking agent can be conducted either before or after filaments have been formed.

The following examples are given in illustration and are not intended as limitations on the scope of this invention. Where parts are mentioned, they are parts by weight.

*Example I*

Add 0.1 part of the sodium salt of octadecyl naphthalene sulfonic acid and 0.01 part of potassium persulfate to 200 parts of water. The pH of the resulting solution will be about 7. Slowly add a mixture of 90 parts of acrylonitrile and 10 parts of vinyl sulfonamide with constant agitation. Throughout the addition of the monomer mixture, maintain the aqueous solution at reflux temperature and atmospheric pressure. After all of the monomer is added, continue the agitation and the heating under reflux for about one hour. The product is a granular suspension of a copolymer of acrylonitrile and vinyl sulfonamide containing approximately 90 parts by weight of acrylonitrile and 10 parts by weight of vinyl sulfonamide. The copolymer may be recovered by filtration and may be freed from emulsifying agent and catalyst residues by washing with water. The copolymer is substantially insoluble in water but is soluble in many organic solvents such as formamide, acetamide, dialkyl formamides, dialkyl acetamides, dimethyl carbamyl compounds, cyanomethyl compounds, etc. Solutions of the copolymers may be used for preparing films, fibers, filaments, etc. by extruding the solutions into a coagulative medium or an evaporative atmosphere.

*Example II*

Add about 0.5 part of the sodium salt of dioctyl sulfosuccinic acid and about 0.3 part of potassium persulfate to 200 parts of water. The pH of the resulting solution will be about 6. Slowly add a mixture of 99 parts of acrylonitrile monomer and 1.0 part of vinyl sulfonamide monomer with constant agitation. Maintain the solution under constant agitation at reflux temperature and atmospheric pressure throughout the addition of the monomer mixture and for about one hour thereafter. The product is an aqueous suspension of a copolymer of 99 parts of acrylonitrile and 1.0 part of vinyl sulfonamide. The copolymer may be recovered by filtration and purified by washing with water. It is insoluble in water but soluble in the organic solvents conventionally used for dissolving acrylonitrile homopolymers.

*Example III*

Heat 1000 parts of freshly distilled dimethyl formamide to a temperature of about 100° C. and dissolve therein about 90 parts of acrylonitrile, 10 parts of vinyl sulfonamide and 0.5 part of acetyl peroxide. The resultant solution is substantially neutral. Maintain the solution at a temperature of about 100° C. for a period of 24 hours. At the end of this time, substantially all of the acrylonitrile has copolymerized with substantially all of the vinyl sulfonamide, the copolymer containing about 90 parts of acrylonitrile and 10 parts of vinyl sulfonamide. The product is a viscous gel.

If the acetyl peroxide of the preceding example is replaced by sodium ethylate, the product will not be a copolymer but will consist essentially of the cyanoethylation product of acrylonitrile and vinyl sulfonamide.

*Example IV*

Extrude the viscous gel obtained as the product of Example III through a six-denier spinneret into a coagulating bath of acetone in order to form filaments. Pass the resultant filaments through an atmosphere saturated with formaldehyde vapors at a temperature of 125° C. and then through a heating zone to remove excess formaldehyde. The acrylonitrile-vinyl sulfonamide copolymers are cross-linked as a result of the treatment with formaldehyde and the tensile strength and heat distortion temperature of the filaments is greatly increased.

The starting materials for the present invention are monomeric acrylonitrile and monomeric vinyl sulfonamide. Acrylonitrile is a well-known compound commercially available in large amounts. Vinyl sulfonamide may be prepared by the dehydration of the ammonium salt of vinyl sulfonamide as shown in co-pending application Serial No. 274,514 filed March 1, 1952 in the name of Harold F. Park.

The copolymers of the present invention are prepared by copolymerizing a mixture of from 85 to 99 parts of acrylonitrile and from 15 to 1 parts of vinyl sulfonamide in a liquid medium at a pH of from 3.0 to 8.0. The liquid medium should be water or a polar organic solvent that is non-reactive with acrylonitrile and vinyl sulfonamide. Acrylonitrile will react with many polar organic solvents under either basic or acidic conditions and sometimes both in order to form cyanoethylation products. Therefore, some care should be exercised in selecting the solvent. Generally speaking, the operable organic solvents are the polar organic solvents for acrylonitrile that are non-reactive therewith under the pH conditions employed. Among the solvents that may be used at any pH within the range of from about 3.0 to 3.8 are the dialkyl formamides, dialkyl sulfones, dialkyl acetamides, etc.; representative solvents including dimethyl formamide, dimethyl sulfone, dioxane, ethylene carbonate, N-formal morpholine, etc. Other suitable solvents that are preferably used only under acidic conditions include the aliphatic alcohols, especially the lower aliphatic alcohols having from 1 to 4 carbon atoms, methyl carbamate, malonitrile, etc.

The vinyl sulfonamide-acrylonitrile copolymers are substantially insoluble in water and are also relatively insoluble in many of the polar organic solvents in which the monomers are soluble, e. g., the aliphatic alcohols, dioxane, etc. However, the copolymers are soluble in substantially all of the organic solvents used for dissolving polyacrylonitrile, such solvents including the dialkyl sulfones, dialkyl formamides, dialkyl acetamides, dimethyl carbamyl compounds, cyanomethyl compounds, etc.

By judicious selection of the solvent for the polymerization reaction, it is possible to obtain the copolymers at the end of the reaction in a wide variety of physical conditions. Thus, a solvent for the copolymer may be used as the solvent for the monomer mixture as in Example III, in which case a solution of the copolymer is obtained when the reaction is complete. Such solutions may be spun into filaments without further treatment as shown by Example IV. If desired, a non-solvent for the copolymer may be used as the solvent for the monomer mixture and if such is the case, a suspension of the copolymer will be obtained at the end of the reaction. When a non-solvent for the copolymer is used as the solvent for the monomer mixture, the particle size of the copolymers can be regulated through the addition of an emulsifying or suspending agent as in Examples I and II.

Any suitable emulsifying or suspending agent or both may be used in place of the sodium octadecyl naphthalene sulfonate and sodium dioctyl sulfosuccinate of Examples I and II. Suitable emulsifying agents include the alkyl sulfonates, aryl sulfonates, aralkyl sulfonates, etc., non-ionic emulsifying agents such as alkylene oxide condensation products, etc., cationic emulsifying agents such as cetyl benzyl dimethyl ammonium chloride, lauryl triethyl ammonium acetate, etc. Among the suspending agents that may be used are aluminum hydroxide, calcium phosphate, etc. The amount of such agents may be varied as required from about 0.01 to 5.0% by weight based on the monomer mixture.

The polymerization reaction may be conducted at any temperature from room temperature to about 175° C. The reaction proceeds more smoothly and is easier to control when temperatures of from about 50 to 100° C. are used.

The polymerization reaction is preferably accelerated through the use of a suitable polymerization catalyst although polymerization will proceed at a slow rate in the absence of such catalysts. The catalyst should be soluble in the solvent for the monomer mixture. Among the catalysts that are soluble in water, polar organic solvents or both are azo compounds, peroxides, per salts, etc. including the salts of persulfuric acid, perboric acid, peracetic acid, etc. Compounds such as diazodiisopropyl nitrile, sodium perborate, acetyl peroxide, ammonium persulfate, potassium persulfate, hydrogen peroxide, ceric sulfate etc. are illustrative of the catalysts that may be used. Such compounds are free-radical producing catalysts. The amount of catalyst may be varied within the limits of from about 0.001 to 0.5 part of catalyst per 100 parts of monomer mixture.

If desired, other conventional modifiers such as reducing agents, shortstops, etc. may be added to the polymerization medium to regulate the molecular weight of the copolymer and direct the course of the reaction.

In order to prepare the acrylonitrile-vinyl sulfonamide copolymers of the present invention, it is necessary that the reaction be carried out at a pH of from about 3.0 to 8.0. Outside of this pH range, undesirable side reactions occur and, as a result, substantially none of the vinyl sulfonamide will copolymerize with the acrylonitrile. When materials other than vinyl sulfonamide, acrylonitrile and the catalyst are present in the reaction medium, as for example when an emulsifying agent is present, it is frequently necessary to positively control the pH through the use of a suitable buffer.

The copolymers of this invention contain from 1 to 15 parts by weight of vinyl sulfonamide and correspondingly from 99 to 85 parts by weight of acrylonitrile. The copolymers are especially useful for the preparation of fibers and filaments by extruding an organic solvent solution thereof into a coagulant such as water, or into an evaporative atmosphere such as air, nitrogen, steam, etc. The filaments so formed may be stretched while still soft or through an after-softening treatment to orient the copolymer and increase its tensile strength. The organic solvent solutions may also be used to prepare films by casting methods and they are valuable as an ingredient in coating compositions.

The tensile strength and heat distortion temperature of filaments and fibers formed from the copolymers of the present invention may be greatly increased by cross-linking the copolymers with formaldehyde, a polymer thereof, or hexamethylene tetramine. The acrylonitrile-vinyl sulfonamide copolymers may be treated with such cross-linking agents either before or after filaments have been formed. The manner in which this may be accomplished is more completely set forth in co-pending application Serial No. 333,345 filed January 26, 1953, now abandoned, in the name of Harold F. Park, wherein the process for cross-linking vinyl sulfonamide polymers is claimed and more completely described.

One of the most valuable properties of the fibers prepared from the copolymers of the present invention is that they can be dyed with a large number of acid, alkaline and substantive dyes by coupling the dyes directly to the sulfonamide groups. Cross-linking does not materially affect the dyeability of fibers formed from the copolymers. The colors obtained as a result of the coupling reaction are particularly fast to laundering.

*Example V*

Prepare a 5% aqueous solution of Wool Violet 4BN (C. I. 698) and heat to the boiling point. Add fibers made from a copolymer comprising 90 parts by weight of acrylonitrile and 10 parts by weight of vinyl sulfonamide and also fibers prepared from polyacrylonitrile. Acidify the solution with acetic acid and add a 5% sodium sulfite solution. Boil for 10 minutes and remove the fibers. Wash the fibers with distilled water and dry. The fibers derived from the acrylonitrile-vinyl sulfonamide copolymers are dyed intensely blue whereas the fibers derived from polyacrylonitrile are substantially unaffected by the treatment, having only a slight blue tinge.

What is claimed is:

1. A copolymer of from 85 to 99 parts of acrylonitrile and from 15 to 1 parts of vinyl sulfonamide.

2. A copolymer of 90 parts of acrylonitrile and 10 parts of vinyl sulfonamide.

3. A synthetic fiber consisting essentially of a copolymer of from 85 to 99 parts of acrylonitrile and from 15 to 1 parts of vinyl sulfonamide.

References Cited in the file of this patent

UNITED STATES PATENTS

| 2,324,896 | Zerweck | July 20, 1943 |
| 2,464,120 | Dickey | Mar. 8, 1949 |

FOREIGN PATENTS

| 878,568 | France | Oct. 19, 1942 |